July 1, 1924.  
H. LICHTE  
1,499,833  
METHOD OF AND DEVICE FOR APPLYING A PROTECTIVE LAYER TO FILMS  
Filed Dec. 24, 1921 2 Sheets-Sheet 1
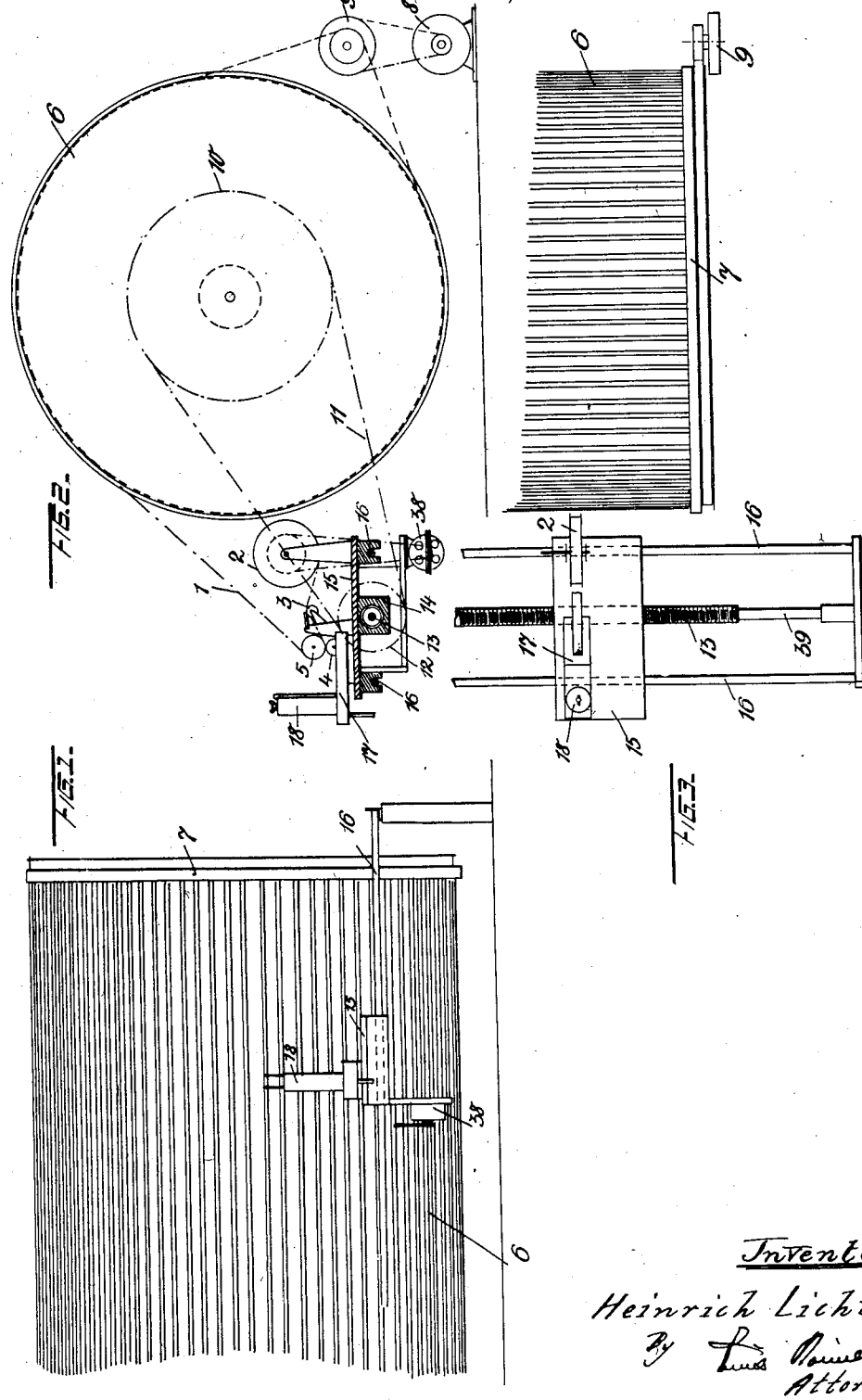
Inventor:  
Heinrich Lichte

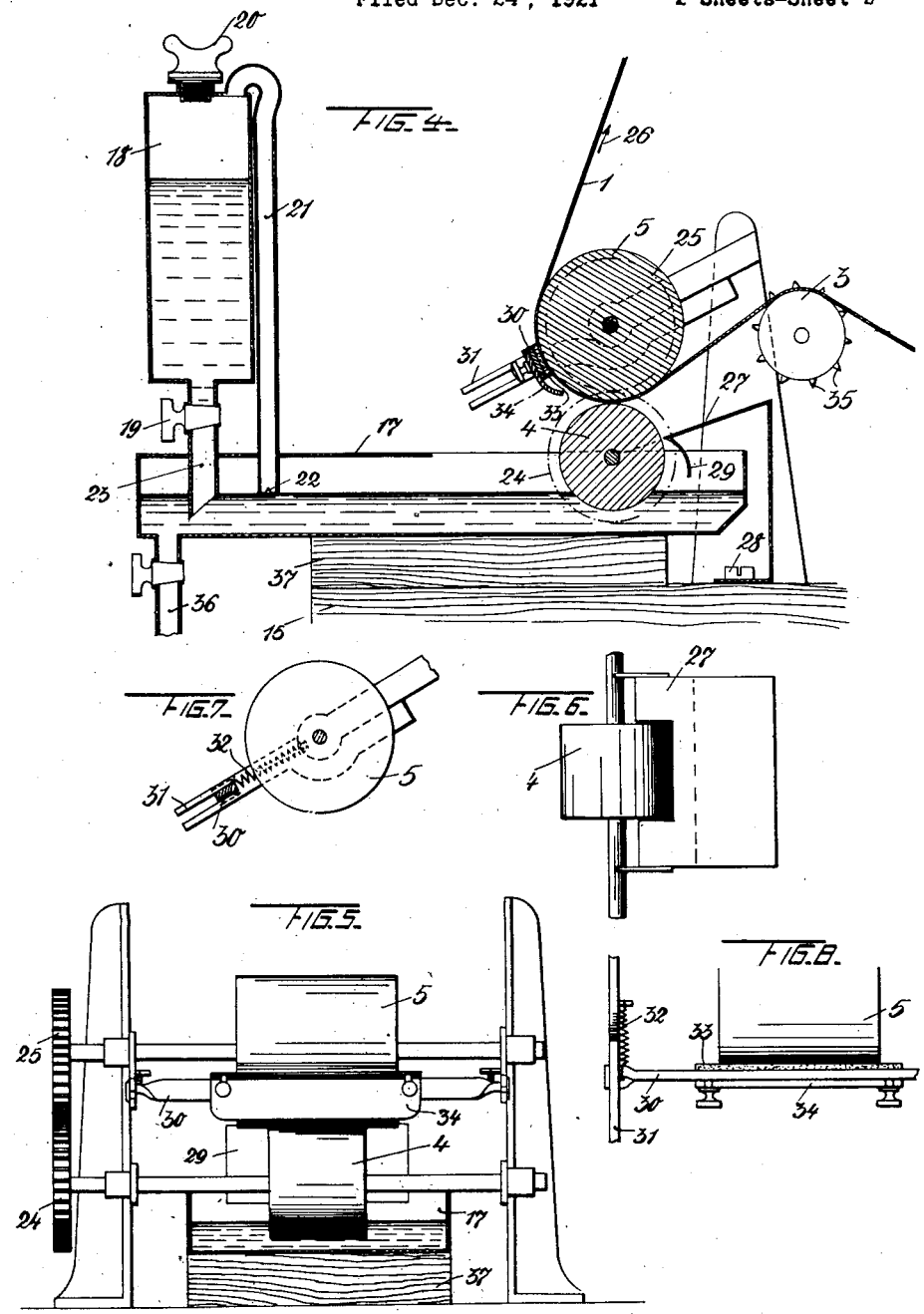

Patented July 1, 1924.

1,499,833

UNITED STATES PATENT OFFICE.

HEINRICH LICHTE, OF BERLIN, GERMANY, ASSIGNOR TO DURA FILM PROTECTOR CO., OF NEW YORK, N. Y., A CORPORATION OF NEW YORK.

METHOD OF AND DEVICE FOR APPLYING A PROTECTIVE LAYER TO FILMS.

Application filed December 24, 1921. Serial No. 524,640.

*To all whom it may concern:*

Be it known that I, HEINRICH LICHTE, a citizen of the German Republic, and a resident of Berlin, Germany, have invented new and useful Improved Methods of and Devices for Applying a Protective Layer to Films, of which the following is a specification.

It is already known to apply to films a special protective layer invented to protect the picture layer of the film against damage by rain and scratches or other mechanical causes and being applied to the film in liquid state and protecting its picture layer after having dried.

The present invention relates to a device by means of which the protective layer may be mechanically applied to the film. Besides the extraordinarily quick and cheap manner of operation, the invention offers the special advantage that the layer is quite uniformly applied.

In order to make my invention more clear, I refer to the accompanying drawing, in which similar numbers of reference denote similar parts throughout the several views, and in which Figure 1 is a diagrammatic front view of the device; Figure 2 is a diagrammatic side view partly in vertical section; Figure 3 is a plan of the parts shown in Fig. 2; Fig. 4 is a vertical section through the applying device proper, this figure showing the lefthand parts of Fig. 2 drawn on a greatly enlarged scale; Fig. 5 is a front view of the righthand parts of Fig. 4; Figure 6 is a plan of the lower roller (4) of the applying device and of some adjacent parts; Figure 7 is a side view of the upper roller (5) of said device and of some adjacent parts; and Figure 8 is a plan of the parts shown in Fig. 7.

The film 1 to be treated in and by the device is indicated in Fig. 2 by a dotted line and is wound in the usual manner upon a drum 2, preferably of such a kind as employed also in performance apparatus. The film coming from the drum is conducted over a guide roller 3 and between an applying or coating roller 4 and another guide roller 5 to a drum 6 consisting preferably of two side disks 7 7 connected with each other by bars, as shown in Figs. 1 and 3. The surface of the drum 6 is plain or uninterrupted, and its diameter is rather great, because this drum receives the film that has been provided with the protective layer and is now to dry upon that drum.

The drum 6 is rotated by an electromotor 8, for instance by intermediate gearing 9. A sprocket wheel 10 is affixed to the shaft of the drum and connected with another sprocket wheel 12 by a chain 11. The wheel 12 is secured to a shaft 13 which is screw-threaded like a guide spindle or lead screw of an engine lathe. The threaded shaft 13 passes through a nut 14 which is affixed to the lower side of a table 15 carrying the coating device proper. The table 15 is displaced in the direction of the spindle or screw 13 by the rotation of this latter and the mediation of the nut 14. The table is guided during this motion by two guide bars 16 arranged parallelly to the spindle 13 upon opposite sides of the same. The pitch of the spindle-thread and the ratio of gear between the chain wheels 10 and 12 are such that at one revolution of the drum 6 the table is displaced for a little more than the breadth of the film. If, thus, the drum rotates continuously, the film is wound upon it in such a manner that small spaces remain between the consecutive convolutions.

The applying device proper is shown in Figs. 4-8. In Figs. 4 and 5, 17 is a flat receptacle or trough which contains the liquid mass that is to form the protective layer. The liquid mass is fed from a vessel 18 provided with a cock 19 at its lower end and with a screw plug 20 in its top. The vessel 18 is filled with the mass after the plug 20 has been removed and the cock 19 closed. Then the plug is again screwed in place. A pipe 21 extends along the vessel 18 from its top down into the receptacle 17 where the pipe terminates at the level of the mass therein contained. The lower end of said tube has at least one notch 22. The cock 19 is arranged in an outlet pipe 23 extending from the bottom of the vessel 18, and the liquid mass flows down into the receptacle 17 and fills it until the mass reaches the lower end of the pipe 21 and closes the notch or notches 22 of the same. As long as the cock 19 is open, the level of the mass remains the same in spite of the consumption due the action of the applying device and as soon as the notch or notches 22 become uncovered by the mass in the receptacle 17 air passes through the pipe 21 into the receptacle 18 and a corresponding quantity of the liquid mass passes through the pipe 23 into the receptacle in order to re-establish the normal level. The triangular notch or notches and the obliquely cut end of the pipe 23 are provided because of the mass being not actually liquid in the ordinary sense of this word but semi-liquid and those configurations ensure the uniformity of the supply which otherwise would not be uniform.

The applying roller 4, Figs. 4–6, dips into the semi-liquid protective mass and conveys it to the film 1 which passes between that roller 4 and a guide-roller 5. These rollers are coupled with each other by means of cog-wheels 24 and 25 affixed to the shafts of said rollers and meshing with each other. Owing to the drum 6 pulling the film in the direction of the arrow 26, Fig. 4, the roller 5 is rotated and the rotation is positively transmitted to the roller 4 by the mediation of the cog-wheels 24 and 25.

The roller 4 is shorter or smaller than the guide roller 5; its axial length corresponds to the width between the usual lateral series of holes provided in the film for moving it. Thus, only the picture-carrying portion of the film is provided with the protective layer. In order to regulate the thickness of the layer a scraping device is provided. It consists of a piece 27 of sheet-metal which is secured by screws 28 to the table 15 and forms at its upper portion an oblique scraper which is directed towards the roller 4 and is downwardly bent at its free end, forming there a catch 29 for catching up particles that may have been flung away from the roller 4 in the case of this latter rotating at a high speed. The foot of the sheet-metal piece is slotted for the passage of the screws 28 therethrough so as to permit of an adjustment of said piece relatively to the roller 4 in order to regulate and determine the thickness of the layer to be applied to the film.

Whilst the film runs over the guide roller 5 in the direction of the arrow 26 it is acted on also by a distributor (consisting of parts 30, 31, 32, 33, 34, all fully described hereinafter) the object of which is to distribute or spread over the whole breadth of the film the mass applied to it by the roller 4. Applying the mass immediately over the whole breadth of the film is not possible for the reason that a greater or lesser number of the lateral holes might be clogged and closed by it. The distributor consists of a rail 30, Figs. 7 and 8, which is slidably fitted at its ends in forked guides 31. Springs 32 draw the rail 30 against the roller 5. At the surface contacting with the drum the rail is provided with a cushion 33 of cloth or velvet or the like, this cushion being the member proper which distributes the mass over the whole breadth of the film. The cushion 33 is removably attached to the rail 30 and this latter carries at its other side a protective rail 34 which extends below the cushion, as shown in Fig. 4.

The guide roller 3 has two circular rows of projections 35 which are so disposed as to be able to engage the lateral holes of the film.

To permit completely emptying the receptacle 17 after the coating operation is finished, a discharge branch 36 with a cock is provided at its bottom. The receptacle 17 is supported by a wooden block 37 supported in its turn by the table 15. This arrangement permits of easily removing the receptacle 17 which may then be lowered to such an extent as to become entirely disengaged from the roller 4 and the pipes 21 and 23.

The manner of operation of the device is as follows:

First, the film which is wound upon the drum 2 is drawn over the guide roller 3, and between the rollers 4 and 5, after which the end of the film is affixed to any of the rods of the drum 6 by any suitable means, for instance a clamp or the like. Now the distributor (consisting of the parts 30, 31, 32, 33, 34) is made to press the film against the roller 5, and the receptacle 17 is filled with the semi-liquid protective mass by opening the cock 19 of the discharge pipe 23 of the vessel 18. Now the motor 8 is thrown into circuit whereby the film is drawn between the rollers 4 and 5 and also this latter roller is rotated by the mediation of the cog-wheels 24 and 25. At the same time the threaded spindle 13 is rotated and displaces the table 15 with all parts it carries parallelly to the drum 6, the motions being so timed that the consecutive convolutions of the film upon the drum do not contact with each other, but a small space remains between them.

Whilst passing between the rollers 4 and 5 the film is provided with a layer of the protective mass, and whilst the film passes between the roller 5 and the distributor that layer is distributed or spread over its whole breadth, after which the film is wound upon the drum 6 in the just described manner.

The semi-liquid mass employed for the protective layer is a quickly drying one. Owing to this, the film after having been treated as above described, and wound upon the drum, may instantly be taken off the drum and wound up to form a roll as usual. This is preferably effected in the manner that the finished film is wound directly from the drum 6 upon the drum 2, without being re-wound through the rollers 4 and 5. To rotate the drum 2 for this purpose a special motor 38 Fig. 2, may be provided, and at the same time the spindle 13 is rotated in the reverse direction so that also the table 15 is moved in the reverse direction and the drum 2 is always in the proper position with respect to the film coming from the drum 6. The motor 38 is preferably so powerful that it is capable of rotating also the spindle 13 and the drum 6, whereas the motor 8 is out of circuit during that time. But the arrangement may be also such that both motors run.

The end portions 39 of the spindle 13 are not threaded as shown in Fig. 3. The object of this is to prevent damage to the apparatus by the motor continuing its rotation when the film has either completely covered the drum 6 or completely left it. At such times the nut 14 of the table 15 reaches the unthreaded portions 39 of the spindle 13 whereby the further displacement of the table is stopped.

It is a matter of course that certain details of the apparatus may be altered without departing from the invention. Thus, for instance, the threaded spindle 13/39 may be replaced by another guide and operating means which is also dependent upon the drum 6, and its direction of rotation and displaces the table 15 with all it carries correspondingly. Also the drum 6 may be replaced by another body which need not necessarily be rotary, but is moved to and fro.

Having now described my invention, what I desire to secure by a patent of the United States is:

1. Apparatus for applying a protective layer to films, comprising, in combination, an applying device; a plain-surfaced rotary drum adapted to receive the film coming from said device; gearing adapted to displace said applying device laterally relatively to said drum and including a threaded spindle; and means for rotating said spindle at such a speed that the applying device is displaced during one revolution of the drum along a path which is longer than the breadth of the film, thereby to dispose the adjacent edges of the successive convolutions of the film in spaced, non-contacting relation upon said drum, substantially as described.

2. Apparatus for applying a protective layer to films, comprising, in combination, an applying device; a plain-surfaced rotary drum adapted to receive the film coming from said device; gearing adapted to displace said applying device laterally relatively to said drum and including a threaded spindle; means for rotating said drum; and means for transmitting the motion from said rotating means to the said spindle with such a ratio of gearing that the applying device is displaced during one revolution of the drum along a path which is longer than the breadth of the film, thereby to dispose the adjacent edges of the successive convolutions of the film in spaced, non-contacting relation upon said drum, substantially as described.

3. Apparatus for applying a protective layer to films, comprising, in combination, an applying device; a table carrying said device; a nut attached to the bottom of said table; a rotary drum adapted to receive the film coming from said device; gearing adapted to displace said applying device laterally relatively to said drum and including a threaded spindle passing through said nut and having unthreaded end portions; means for rotating said drum; and means for transmitting the motion to the said spindle, substantially and for the purpose as described.

4. Apparatus for applying a protective layer to films, comprising, in combination, an applying device; a rotary drum adapted to receive the film coming from said device; gearing adapted to displace said applying device laterally relatively to said drum in such a measure that the consecutive convolutions of the film upon the said drum do not contact with each other; and a guide roller adapted to conduct the film to the said applying device and having circumferentially arranged projections adapted to engage the marginal film holes.

5. Apparatus for applying a semi-liquid protective layer to films, comprising, in combination, an applying device; a receptacle adapted to receive the semi-liquid protective mass; a supply vessel adapted to receive supplementary mass; a pipe extending from the top of said vessel down into the said receptacle and having at least one notch at its lower end; another pipe extending from the bottom of the said vessel into the said receptacle; and means to close said latter pipe.

6. Apparatus for applying a protective layer to films, comprising, in combination, an applying device; a rotary drum adapted to receive the film coming from said device; a threaded spindle; a nut attached to the applying device and engaged with the spindle to travel thereon and thereby move said device bodily laterally with relation to the drum, said spindle having unthreaded end portions to terminate the lateral movement of said device when reached by said nut; means for rotating the drum; and means for transmitting the rotation of the drum to the spindle.

7. A method of treating continuous photographic films, comprising the steps of applying a transparent protective coating to the picture-bearing face of the film; and winding the film, as coated, upon a rotary support, while moving the device which applies the coating relatively to the support and in a lateral direction and at such a speed that at a single revolution of said support said device will be shifted a distance greater than the width of the film, thereby to dispose the adjacent edges of the successive convolutions of the film in spaced, non-contacting relation upon the support.

8. A method of treating continuous photographic films, comprising the steps of continuously feeding the film to a coating device to apply a transparent protective coating to the picture-bearing face of the film and solely in the space between the marginal perforations in the film; and winding the film, as coated, upon a support, with the adjacent edges of the successive windings of the film in spaced, non-contacting relation.

9. A method of treating continuous photographic films, comprising the steps of continuously feeding the film to a coating device to apply a transparent protective coating to the picture-bearing face of the film and solely in the space between the marginal perforations in the film; distributing the coating evenly over said space; and winding the film, as coated, upon a support, with the adjacent edges of the successive windings of the film in spaced, non-contacting relation.

In testimony whereof I affix my signature in presence of two witnesses.

HEINRICH LICHTE.

Witnesses:
 EMORY H. LORD,
 ARTHUR SCHROEDER.